June 16, 1942.    E. F. HUDDLE    2,286,277
MATERIAL REDUCING APPARATUS
Filed Dec. 29, 1939
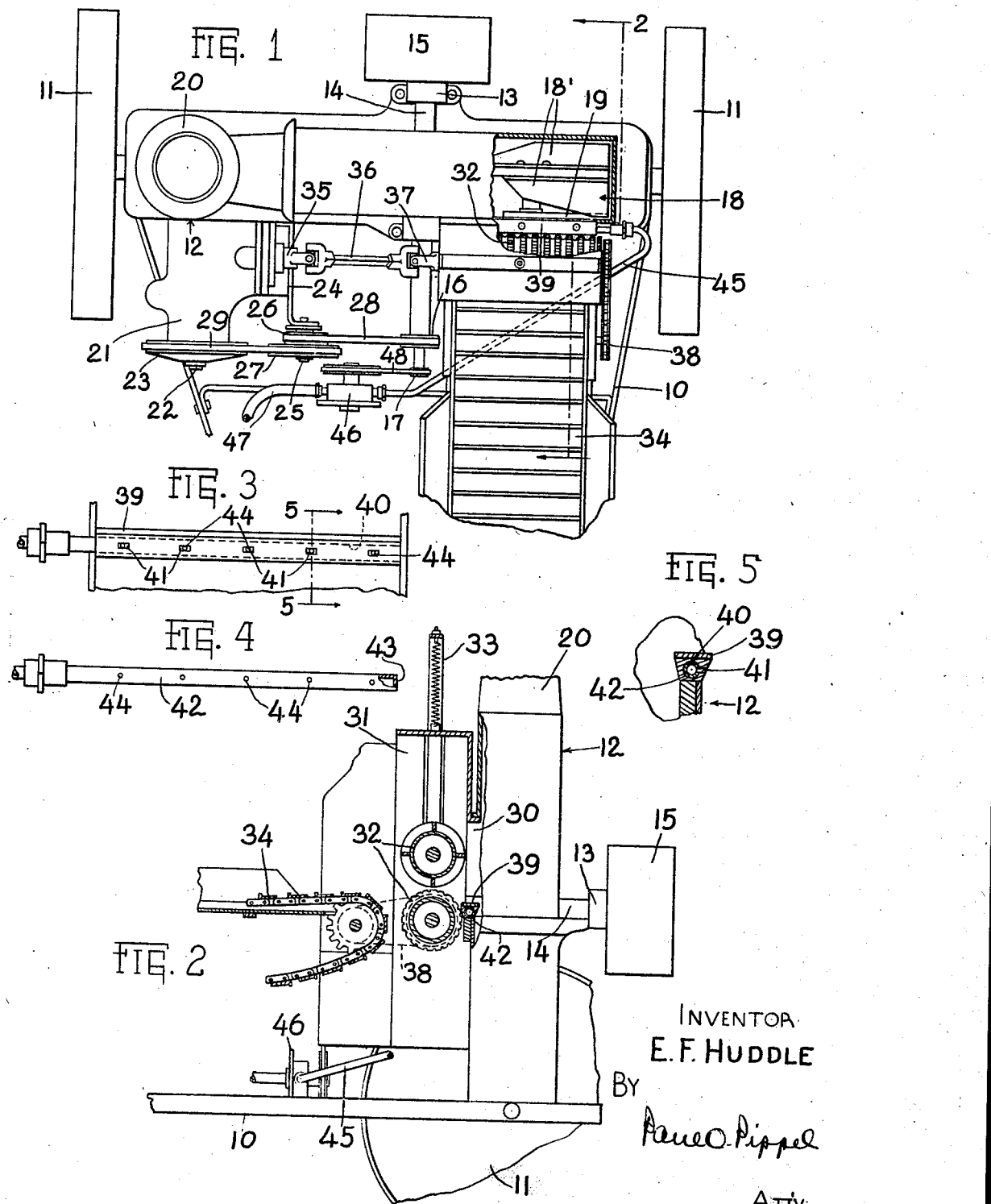
INVENTOR
E. F. HUDDLE
BY
ATTY.

Patented June 16, 1942

2,286,277

UNITED STATES PATENT OFFICE 2,286,277

MATERIAL REDUCING APPARATUS

Edwin F. Huddle, Chicago, Ill., assignor to International Harvester Company, a corporation of New Jersey Application December 29, 1939, Serial No. 311,666

4 Claims. (Cl. 146—106)

This invention relates to a material reducing apparatus of the type including ensilage cutters and the like, and more particularly to an improved means for supplying a treating medium to be mixed with the reduced material.

Machines of the type referred to comprise generally a material reducing drum, to which material is fed to be reduced by a reducing means carried in the drum. It has been found desirable to supply a treating medium, such as molasses, water or the like, to the material to be mixed therewith.

The principal object of the present invention is to provide means for supplying such medium directly to the material reducing drum to be mixed therein with the material as the material is being reduced.

An important object is to provide means for directing the medium in the form of a shear bar cooperating with the material reducing means, wherein the shear bar is formed hollow and includes distributing openings adapted to direct the treating medium to be mixed with the material.

Briefly, and specifically, these and other important objects and desirable features are achieved in one preferred form of the invention in a material reducing apparatus of the ensilage cutter type. Such a machine consists of a material reducing chamber having a feed throat with which is associated a material delivery conveyor for supplying material to be reduced to the chamber. A shear bar is positioned at the feed throat and cooperates with the cutter knives on the material reducing rotor carried in the chamber. This bar is formed hollow and includes distributing openings preferably directed into the chamber for supplying a treating medium to the chamber to be mixed with the reduced material.

A more complete understanding of the objects and features of the invention may be had from the following detailed description taken in conjunction with the accompanying sheet of drawings, wherein:

Figure 1 is a plan view, partly in section, of the forward end of an ensilage cutter;

Figure 2 is an elevational view, partly in section, as seen along the line 2—2 of Figure 1;

Figure 3 is an enlarged view of the improved shear bar construction;

Figure 4 is a view of the supply tube which is connected to the shear bar; and,

Figure 5 is a sectional view through the shear bar taken substantially along the line 5—5 of Figure 3.

The machine chosen for the purposes of illustration is an ensilage cutter comprising a frame 10 carried at its forward end on a pair of ground wheels 11. A forwardly disposed material reducing chamber or drum 12 is arranged between the wheels 11, substantially above the axis thereof, and includes a forwardly extending bearing portion 13 for supporting a rotatable drive shaft 14, on which is carried a driving pulley 15. This shaft extends longitudinally of the frame 10 and through the axis of the drum 12, extending rearwardly of the drum where it is provided with a pair of pulleys 16 and 17. The shaft 14 carries for rotation therewith within the drum 12 a material reducing means in the form of a rotor 18 including blades 18' and cutter knives 19, of each of which only one is shown. The drum is provided at one side thereof with a suitable delivery pipe 20, through which reduced material is delivered to a silo or the like.

The lower portion of the drum is preferably formed as a casting and rigidly carries a rearwardly extending gear housing 21 including a shaft 22 on which is carried a pulley 23. The housing 21 carries a rearwardly extending bracket 24 which supports a shaft 25 carrying a pair of pulleys 26 and 27. The pulley 26 is connected by a belt 28 to the pulley 16 on the rotor shaft 14. The pulley 27 is connected to the pulley 23 by a belt 29.

The rear wall of the drum or chamber 12 is open to provide a feed throat 30. Rearwardly of this opening is a feed roll chamber 31, in which is positioned a pair of feed rollers 32, the upper of which is resiliently supported in a suitable manner by resilient means in the form of a spring-mounted yoke 33. The rearward end of the feed roll chamber 31 is open and has associated therewith a material-delivering conveyor 34 arranged longitudinally of the frame 10.

The gear housing 21 includes gearing, not shown, for driving a transversely extending shaft 35 which is flexibly connected by a shaft 36 to a shaft 37 which drives the lower feed rolls 32. A drive chain 38 suitably drives the conveyor 34.

As best shown in Figures 2 and 5, the drum 12 carries in the feed throat opening 30 a shear bar 39. This bar is disposed transversely of the feed throat opening and cooperates with the cutter knives 19 on the rotor 18 to reduce material delivered to the chamber 12 through the feed throat 30 by the conveyor 34. This shear bar is preferably formed hollow, as at 40, and includes a plurality of distributing openings 41 directed toward the inside of the drum 12. The shear bar is fitted with a tube or pipe 42 having one end closed, as at 43, and provided with a plurality of openings 44 alined with the openings 41 in the bar. The tube 42 forms part of a conduit 45 connected with a pump 46 for supplying a treating medium, such as molasses, to the drum 12. The pump 46 is connected by an intake 47 to a suitable supply of such treating medium and is driven by means of a belt 48 trained about the pulley 17 at the rear end of the rotor shaft 14.

In the operation of the machine, material is distributed on the conveyor 34 in any suitable manner. This material is carried forwardly by the conveyor and passes between the feed rolls 32 and thence into the reducing chamber or drum 12 to be reduced by the rotor 18. By means of the aforesaid driving connections, the molasses pump 46 is operated to supply molasses to the shear bar 39, from which it is directed through the openings 41 and 44 in the bar and tube, respectively, into the drum 12 to be mixed with the material as the material is being reduced. It will thus be seen that the molasses does not become associated with the material in the feed roll chamber or at any point at the conveyor side of the feed throat opening 30. This provision enables the rolls 32 to be maintained free of deposits of combined molasses and particles of delivered material. The molasses is admirably mixed with the material in the chamber 12 and is delivered in a mixed state from the chamber 12 through the delivery pipe 20.

From the foregoing description it will be seen that a desirable means has been provided for directing treating medium into the chamber of a material reducing apparatus and that this means is preferably formed as a part of the shear bar of the machine. Further objects and features of the invention will be apparent to those skilled in the art. It will be further appreciated that only a preferred embodiment of the invention has been illustrated and described and that numerous modifications and alterations may be made therein without departing from the spirit and scope of the invention as defined in the appended claims.

What is claimed is:

1. In an ensilage cutter having a drum, a material-reducing rotor in the drum and including a cutter knife, material delivery means associated with the drum, and means for supplying a treating medium under pressure, the combination with the drum of a shear bar positioned in the drum for cooperation with the cutter knife on the rotor, said bar being formed hollow and having an opening directed toward the path of material delivered by the delivery means, and a conduit connecting the treating medium supply means and the shear bar for supplying said medium to the shear bar to be mixed with the delivered material.

2. In an ensilage cutter having a drum, a material-reducing rotor in the drum and including a cutter knife, material delivery means associated with the drum, and means for supplying a treating medium under pressure, the combination with the drum of a shear bar positioned in the drum for cooperation with the cutter knife on the rotor, said bar being formed hollow and having an opening directed toward the inside of the drum, and a conduit connecting the treating-medium supply means and the shear bar for supplying said medium to the drum to be mixed with the reduced material.

3. In an ensilage cutter having a drum, a material reducing rotor in the drum and including a cutter knife, material delivery means associated with the drum, and means for supplying a treating medium under pressure, the combination with the drum of a shear bar positioned in the drum for cooperation with the cutter knife on the rotor, said bar being formed hollow and having an opening directed toward the inside of the drum, and a conduit connecting the treating medium supply means and the shear bar for supplying said medium to the drum to be mixed with the reduced material, said conduit including a tube fitting the hollow shear bar and having an opening alined with the aforesaid opening in the shear bar.

4. In an ensilage cutter having a drum, a material reducing rotor in the drum and including a cutter knife, material delivery means associated with the drum, and means for supplying a treating medium under pressure, the combination with the drum of a shear bar positioned in the drum for cooperation with the cutter knife on the rotor, said bar having a cylindrical bore therein including distributing openings communicating with the bore and directed toward the drum, and a conduit connecting the treating medium supply means and the shear bar for supplying said medium to the drum to be mixed with the reduced material, said conduit including a tube fitting the bore in the bar and having a closed end, said tube having openings alined respectively with the distributing openings in the bar.

EDWIN F. HUDDLE.